United States Patent
Tachibana

(10) Patent No.: US 12,250,603 B2
(45) Date of Patent: Mar. 11, 2025

(54) COMMUNICATION DEVICE, CONTROL METHOD, AND STORAGE MEDIUM FOR GENERATING MANAGEMENT FRAMES

(71) Applicant: CANON KABUSHIKI KAISHA, Tokyo (JP)

(72) Inventor: Hideaki Tachibana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 17/932,402

(22) Filed: Sep. 15, 2022

(65) Prior Publication Data

US 2023/0011936 A1 Jan. 12, 2023

Related U.S. Application Data

(63) Continuation of application No. PCT/JP2021/006723, filed on Feb. 24, 2021.

(30) Foreign Application Priority Data

Mar. 17, 2020 (JP) ................................ 2020-046695

(51) Int. Cl.
*H04W 36/06* (2009.01)
*H04L 5/00* (2006.01)
(Continued)

(52) U.S. Cl.
CPC ........... *H04W 36/06* (2013.01); *H04L 5/0096* (2013.01); *H04W 72/0453* (2013.01);
(Continued)

(58) Field of Classification Search
CPC ..... H04W 36/00; H04W 36/06; H04W 72/04; H04W 72/044; H04W 72/0453;
(Continued)

(56) References Cited

U.S. PATENT DOCUMENTS

2014/0010223 A1* 1/2014 Wang .................... H04W 48/12
370/338
2016/0212693 A1 7/2016 Lee
(Continued)

FOREIGN PATENT DOCUMENTS

CN 107211423 A 9/2017
CN 110447146 A 11/2019
(Continued)

OTHER PUBLICATIONS

Minho Cheong (NEWRACOM); "How to Describe 802.11ax Functional Requirements"; IEEE 11-14/0656r0; May 2014; pp. 1-34.
(Continued)

*Primary Examiner* — Warner Wong
(74) *Attorney, Agent, or Firm* — Canon U.S.A., Inc. IP Division

(57) ABSTRACT

In a case where a frequency band in which a wireless network 101 is established by a communication device (102) is switched from a 6 GHz band to another frequency band, the communication device (102) generates a management frame complying with Institute of Electrical and Electronics Engineers (IEEE) 802.11 series standards including Robust Security Network Element (RSNE) including a value "1" in a Management Frame Protection Capable (MFPC) field and a value "0" in a Management Frame Protection Required (MFPR) field, and transmits the generated management frame.

19 Claims, 7 Drawing Sheets

(51) Int. Cl.
  *H04W 72/0453* (2023.01)
  *H04L 41/0213* (2022.01)
  *H04L 41/0246* (2022.01)
  *H04L 41/04* (2022.01)
  *H04L 67/00* (2022.01)
  *H04W 36/24* (2009.01)

(52) U.S. Cl.
  CPC ...... *H04L 41/0213* (2013.01); *H04L 41/0246* (2013.01); *H04L 41/04* (2013.01); *H04L 67/34* (2013.01); *H04W 36/24* (2013.01)

(58) Field of Classification Search
  CPC ..... H04W 28/00; H04W 28/02; H04W 28/19; H04W 28/16; H04W 28/18; H04W 36/16; H04W 36/22; H04W 36/24; H04W 36/34; H04L 5/00; H04L 5/0091; H04L 5/0096; H04L 67/34; H04L 2012/5031; H04L 41/00; H04L 41/0213; H04L 41/0246; H04L 41/04; H04L 41/08
  See application file for complete search history.

(56) References Cited

U.S. PATENT DOCUMENTS

| | | | | |
|---|---|---|---|---|
| 2018/0324200 | A1* | 11/2018 | Choi | H04W 48/08 |
| 2019/0289539 | A1* | 9/2019 | Lee | H04W 84/18 |
| 2019/0327740 | A1 | 10/2019 | Verma | |
| 2021/0185607 | A1* | 6/2021 | Cariou | H04W 52/0216 |
| 2022/0061051 | A1* | 2/2022 | Song | H04W 72/0453 |
| 2022/0110119 | A1* | 4/2022 | Song | H04L 5/001 |
| 2022/0377554 | A1* | 11/2022 | Henry | H04W 12/122 |
| 2024/0236639 | A1* | 7/2024 | Chu | H04W 76/15 |
| 2024/0305409 | A1* | 9/2024 | Kneckt | H04L 1/1642 |

FOREIGN PATENT DOCUMENTS

| | | |
|---|---|---|
| JP | 2012089926 A | 5/2012 |
| JP | 2015-104085 A | 6/2015 |
| KR | 20170062301 A | 6/2017 |
| WO | 2017149526 A2 | 9/2017 |
| WO | 2019045438 A1 | 3/2019 |
| WO | 2020040552 A1 | 2/2020 |

OTHER PUBLICATIONS

IEEE Standard for Information technolog•• Telecommunications and information exchange between systems—local and metropolitan area networks • Specific requirements; Part 11 : Wireless LAN Medium Access Control (MAC) and Physical layer (PHY) Specifications; Amendment 4: Protected Management Frames; IEEE Computer Society; Sponsored by the LAN/MAN Standards Committee; pp. 1-111.

Nayarasi; "mrn-cciew—My CCIE Wireless Journey & More . . . "; WPA3-SAE Mode; Nov. 29, 2019; https://mrncciew.com/2019/11/29/wpa3-sae-mode/; pp. 1-14.

Md Sohail Ahmad, et al.; "Short Paper: Security Evaluation of IEEE 802.11w Specification"; pp. 53-58.

WiFi Alliance, WPA3 Specification Version 2.0, 2019, https://www.wi-fi.org/file/wpa3-specification.

* cited by examiner

FIG.5

Robust Security Network Element

| Element ID | Length | Version | Group Data Cipher Suite | Pairwise Cipher Suite Count | Pairwise Cipher Suite List |
|---|---|---|---|---|---|
| 1 | 1 | 2 | 0 or 4 | 0 or 2 | 0 or (4 x m) |

Octets:

| AKM Suite Count | AKM Suite List | RSN Capabilities | PMKID Count | PMKID List | Group Management Cipher Suite |
|---|---|---|---|---|---|
| 0 or 2 | 0 or (4 x n) | 0 or 2 | 0 or 2 | 0 or (16 x s) | 0 or 4 |

Octets:

FIG.6

RSN Capabilities

| B0 | B1 | B2 | B3 | B4 | B5 | B6 | B7 |
|---|---|---|---|---|---|---|---|
| Preauthentication | No Pairwise | PTKSA Replay Counter | | GTKSA Replay Counter | | Management Frame Protection Required (MFPR) | Management Frame Protection Capable (MFPC) |

Bits: 1, 1, 2, 2, 1, 1

| B8 | B9 | B10 | B11 | B12 | B13 | B14 B15 |
|---|---|---|---|---|---|---|
| Joint Multi-Band RSNA | PeerKey Enabled | SPP A-MSDU Capable | SPP A-MSDU Required | PBAC | Extended Key ID for Individually Addressed Frames | Reserved |

Bits: 1, 1, 1, 1, 1, 1, 2

FIG.7

| AP<br>STA | PMF Disabled | PMF Enabled | PMF Required |
|---|---|---|---|
| PMF Disabled | ○ | ○ | × |
| PMF Enabled | ○ | ○ | ○ |
| PMF Required | × | ○ | ○ |

COMMUNICATION DEVICE, CONTROL METHOD, AND STORAGE MEDIUM FOR GENERATING MANAGEMENT FRAMES

CROSS-REFERENCE TO RELATED APPLICATIONS

This application is a Continuation of International Patent Application No. PCT/JP2021/006723, filed Feb. 24, 2021, which claims the benefit of Japanese Patent Application No. 2020-046695, filed Mar. 17, 2020, both of which are hereby incorporated by reference herein in their entirety.

BACKGROUND OF THE INVENTION

Field of the Invention

The present invention relates to protection of frames by a communication device.

Background Art

In wireless communication complying with Institute of Electrical and Electronics Engineers (IEEE) 802.11 series standards, a technique called Protected Management Frame (PMF) in which a management frame is encrypted and communicated is known. The IEEE 802.11 series standards are wireless communication standards discussed in the IEEE and include at least one of IEEE 802.11a/b/g/n/ac/ax/be standards. In a case of using a 2.4 GHz band and a 5 GHz band as frequency bands, the use of PMF is optional.

The use of a 6 GHz band has been discussed in addition to the 2.4 GHz band and the 5 GHz band, which have heretofore been used, as frequency bands in Wi-Fi® 6 developed by Wi-Fi® Alliance as an authentication program complying with the IEEE 802.11ax standard. Communication in the 6 GHz band that requires PMF has also been discussed.

PTL-1 discusses a technique for making a setting for security when wireless communication is established.

The use of PMF is optional in the 2.4 GHz band and the 5 GHz band. Accordingly, if the frequency band to be used is switched from the 2.4 GHz band to the 5 GHz band, or from the 5 GHz band to the 2.4 GHz band, there is no need to change the PMF setting. However, in a case of switching the frequency band to be used from the 6 GHz band that requires PMF to another frequency band, it is necessary to appropriately make the PMF setting to establish a connection with another communication device that does not use PMF. This may lead to a decrease in interconnectivity.

CITATION LIST

Patent Literature

PTL1: Japanese Patent Application Laid-Open No. 2012-089926

SUMMARY OF THE INVENTION

In view of the above, the present invention is directed to improving the interconnectivity between communication devices when the frequency band is switched from the 6 GHz band to another frequency band.

In order to achieve the above object, a communication device according to the present invention includes an establishment unit configured to establish a wireless network in a predetermined frequency band, a generation unit configured to generate a management frame complying with Institute of Electrical and Electronics Engineers (IEEE) 802.11 series standards including Robust Security Network Element (RSNE) including a value "1" in a Management Frame Protection Capable (MFPC) field and a value "0" in a Management Frame Protection Required (MFPR) field, in a case where the frequency band of the wireless network established by the establishment unit is switched from a 6 GHz band to another frequency band, and a transmission unit configured to transmit the management frame generated by the generation unit.

Further features of the present invention will become apparent from the following description of exemplary embodiments with reference to the attached drawings.

BRIEF DESCRIPTION OF THE DRAWINGS

FIG. 5 illustrates a frame format for Robust Security Network Element.

FIG. 6 illustrates a frame format for Robust Security Network Capability fields.

FIG. 7 is a connection correspondence table regarding Protected Management Frame.

DESCRIPTION OF THE EMBODIMENTS

Figure 1:
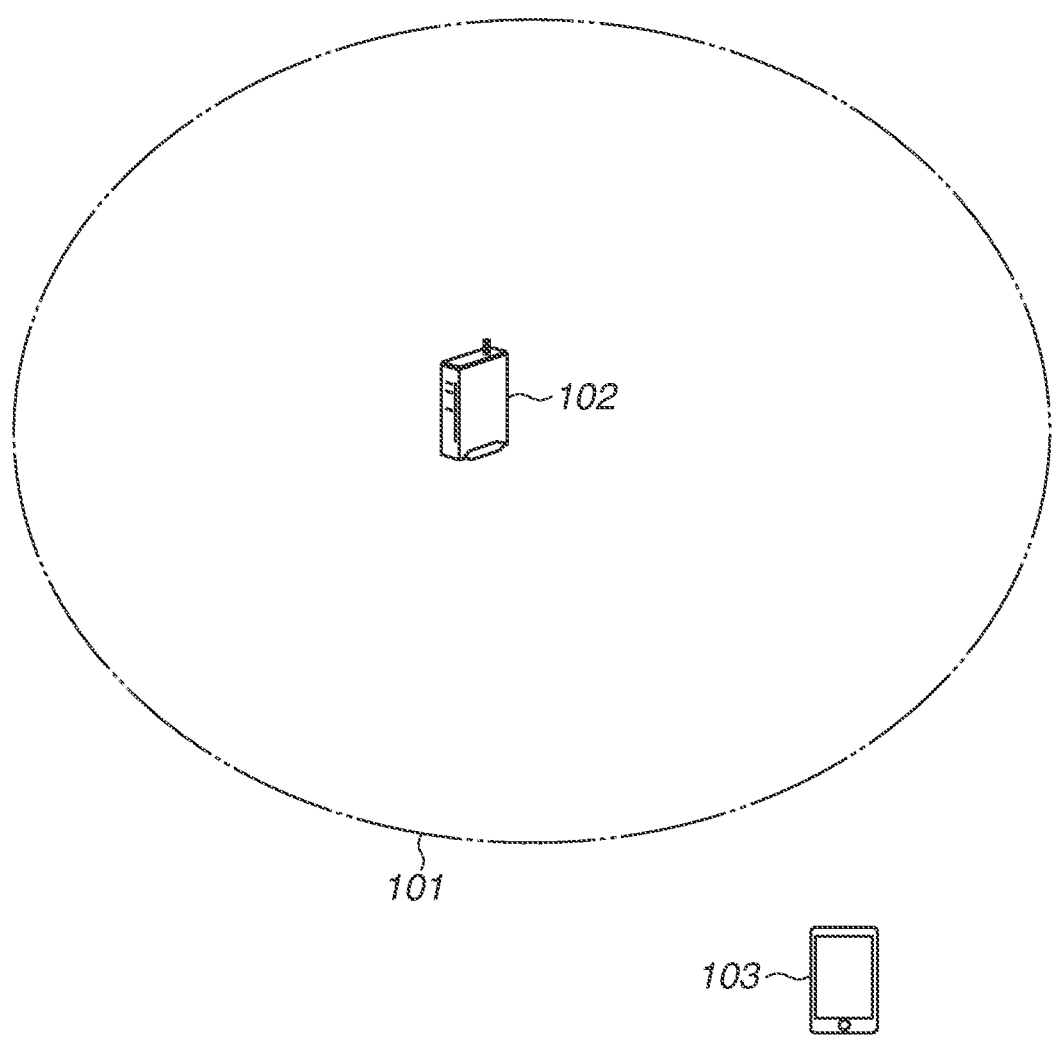
FIG. 1 illustrates a configuration of a network to which a communication device 102 belongs.

Exemplary embodiments of the present invention will be described in detail below with reference to the accompanying drawings. Note that components described in the following exemplary embodiments are merely examples, and the present invention is not limited to the components illustrated in the drawings.

FIG. 1 illustrates a configuration of a network in which a communication device 102 according to an exemplary embodiment participates. The communication device 102 is an access point (AP) having a function for establishing a network 101. The network 101 is a wireless network. A communication device 103 is a station (STA) having a function of participating in the network 101. Each communication device is complying with Institute of Electrical and Electronics Engineers (IEEE) 802.11ax standard and can execute wireless communication complying with the IEEE 802.11ax standard via the network 101. Each communication device can establish communication in frequency bands of a 2.4 GHz band, a 5 GHz band, and a 6 GHz band. A frequency band to be used by each communication device is not limited to these frequency bands. For example, any other frequency band, such as a 60 GHz band, may also be used.

The present exemplary embodiment illustrates an example where the communication devices 102 and 103 establish wireless communication complying with the IEEE 802.11ax standard. However, the present exemplary embodiment is not limited to this standard. The communication devices 102 and 103 may establish wireless communication complying with the IEEE 802.11be standard that is a standard succeeding the IEEE 802.11ax standard. In the IEEE 802.11be standard, communication can be established in the frequency bands of the 2.4 GHz band, the 5 GHz band, and the 6 GHz band, like in the IEEE 802.11ax standard.

While the communication devices 102 and 103 are complying with the IEEE 802.11ax standard, the communication devices 102 and 103 may also be complying with at least one of the legacy standards that are standards prior to the IEEE 802.11ax standard. The legacy standards are IEEE 802.11a/b/g/n/ac standards. Each communication device may also be complying not only with the legacy standards, but also with a standard succeeding the IEEE 802.11ax standard. The standard succeeding the IEEE 802.11ax standard is the IEEE 802.11be standard. Alternatively, each communication device may be complying with a standard succeeding the IEEE 802.11be standard and subsequent standards. In the present exemplary embodiment, at least one of the IEEE 802.11a/b/g/n/ac/ax/be standards is called the IEEE 802.11 series standards. The communication devices 102 and 103 may be complying not only with the IEEE 802.11 series standards, but also with other communication standards such as Bluetooth®, Near Field Communication (NFC), Ultra Wide Band (UWB), Zigbee, and Multi-Band Orthogonal Frequency Division Multiplexing (OFDM) Alliance (MBOA). Samples of UWB include a wireless universal serial bus (USB), wireless 1394, and WiNET. Each communication device may also be compatible with communication standards for wired communication such as a wired local area network (LAN).

The communication device 102 supports Protected Management Frame (PMF). PMF is a function of establishing communication by encrypting a management frame using Pairwise Transient Key (PTK). Specific examples of the management frame to be encrypted include a deauthentication frame, a disassociation frame, and an action frame. Each of these management frames is called Robust Management Frame. PTK is key information used for unicast communication.

The communication device 102 executes PMF to encrypt Robust Management Frame, thereby preventing disconnection due to a disassociation transmitted from, for example, another communication device by spoofing.

The communication device 102 transmits a management frame including information indicating a PMF mode set in the communication device 102, thereby making it possible to provide a notification about the PMF mode set in the communication device 102 to another communication device. Specific examples of the management frame including information indicating the PMF mode include a Beacon frame, a Probe Response frame, and an Association Response frame. A frame format used for the communication device 102 to provide information indicating the PMF mode will be described below with reference to FIGS. 5 and 6.

The communication device 102 can set three modes as the PMF mode. A first mode is a PMF Required mode for establishing a connection only to a communication device capable of executing PMF. A second mode is a PMF Enabled mode for establishing a connection with both types of communication devices, i.e., a communication device capable of executing PMF and a communication device incapable of executing PMF. A third mode is a PMF Disabled mode in which the PMF function of the communication device 102 is disabled. Examples of the communication device incapable of executing PMF may include a communication device that does not support PMF and a communication device that supports PMF but has a configuration in which the PMF function is disabled.

FIG. 7 illustrates a correspondence table indicating PMF modes and information indicating whether a connection can be established. The AP in which PMF Disabled is set cannot be connected to the STA in which PMF Required meaning PMF is required is set. The AP in which PMF Enabled is set can be connected to any one of the STA in which PMF Disabled is set, the STA in which PMF Enabled is set, and the STA in which PMF Required is set. In a case where the AP in which PMF Enabled is set is connected to the STA in which PMF Required is set, Robust Management Frame is encrypted and communicated. In contrast, in a case where the AP in which PMF Enabled is set is connected to the STA in which PMF Disabled is set, Robust Management Frame is not encrypted. The AP in which PMF Required is set cannot be connected to the STA in which PMF Disabled is set.

As illustrated in FIG. 7, the STA to which the AP can be connected varies depending on the PMF mode set in the AP.

In the IEEE 802.11 series standards, when the AP and the STA establish communication in the 2.4 GHz band or the 5 GHz band, PMF may be executed or may not be executed. Accordingly, even if the frequency band to be used when the communication device 102 establishes the network 101 is switched from the 2.4 GHz band to the 5 GHz band, or from the 5 GHz band to the 2.4 GHz band, there is no need to change the PMF setting. In contrast, in the case of establishing communication in the 6 GHz band, the AP and the STA need to execute PMF. Thus, in a case where the frequency band to be used when the communication device 102 in which the PMF setting is disabled establishes the network 101 is switched to the 6 GHz band, the communication device 102 cannot establish communication with another communication device unless the PMF setting to PMF Required is performed. In a case where the frequency band to be used by the communication device 102 in which the PMF setting is enabled is switched to the 6 GHz band, the communication device 102 may be connected to another communication device in which PMF Disabled is set unless the PMF setting is changed to PMF Required. In a case where the frequency band to be used by the communication device 102 is switched from the 6 GHz band to the 2.4 GHz band or the 5 GHz band, the communication device 102 cannot be connected to another communication device in which PMF Disabled is set unless the PMF setting is enabled. This may thus lead to a decrease in connectivity. As described above, in the case where the frequency band to be used by the communication device 102 is switched between the 6 GHz band and the 2.4 GHz band or the 5 GHz band, an inappropriate PMF setting may cause inconvenience for a user.

To establish a wireless network, the communication device 102 needs to set an authentication method to be used. Specific examples of the authentication method include Open, Wi-Fi® Protected Access (WPA), WPA2, and WPA3. Open is an authentication method defined as Open System Authentication in the IEEE 802.11 series standards. In this authentication method, the AP that has received an authentication request from the STA transmits an authentication success message without fail. In this authentication method, the authentication never fails, so that substantial authentication processing is not carried out. WPA is a standard for the authentication method formulated by Wi-Fi® Alliance. WPA2 is a standard succeeding WPA and supports a new encryption method that is not supported in WPA, which leads to improvement of security as compared with WPA. WPA3 is a standard succeeding WPA2. In WPA3, security is further improved.

In Wi-Fi® 6 that is an authentication program complying with the IEEE 802.11ax standard, a configuration in which WPA3 is required as an authentication method to be used for communication in the 6 GHz band has been discussed. In the 2.4 GHz band and the 5 GHz band, any authentication method may be used. In the case of switching the frequency band to be used, the communication device 102 needs to appropriately set the authentication method, as well as PMF. For example, when the frequency band to be used by the communication device 102 is switched from the 6 GHz band to the 2.4 GHz band or the 5 GHz band, if only WPA3 is continuously used as the authentication method, a connection with the STA that supports only up to WPA2 cannot be established, which may cause inconvenience for the user.

Specific examples of the communication device 102 include a wireless LAN router, and a personal computer (PC). However, the communication device 102 is not limited to these examples. Any communication device can be used as the communication device 102, as long as the communication device can execute wireless communication complying with the IEEE 802.11ax standard with another communication device. Specific examples of the communication device 103 include a camera, a tablet, a smartphone, a PC, a mobile phone, and a video camera. However, the communication device 103 is not limited to these examples. Any communication device can be used as the communication device 103, as long as the communication device can execute wireless communication complying with the IEEE 802.11ax standard with another communication device. The network illustrated in FIG. 1 is a network composed of one AP and one STA. However, the number of APs and the number of STAs are not limited to one.

Figure 2:
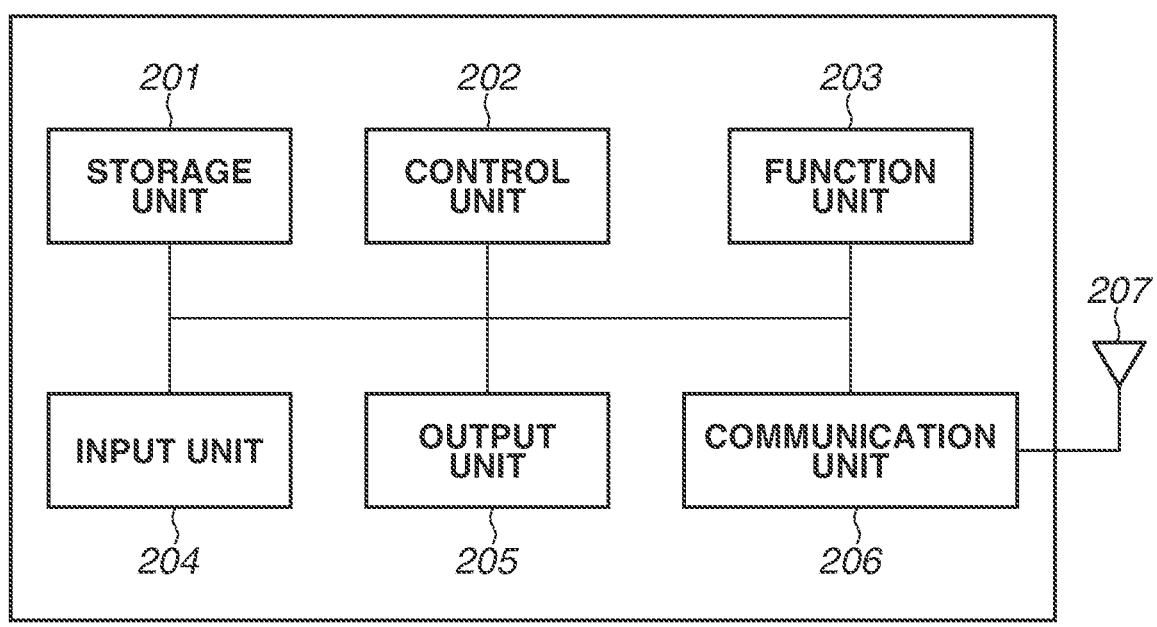
FIG. 2 is a diagram illustrating a hardware configuration of the communication device 102.

FIG. 2 illustrates a hardware configuration of the communication device 102 according to the present exemplary embodiment. The communication device 102 includes a storage unit 201, a control unit 202, a function unit 203, an input unit 204, an output unit 205, a communication unit 206, and an antenna 207.

The storage unit 201 is composed of one or more memories, such as a read-only memory (ROM) and a random access memory (RAM), and stores programs for performing various operations to be described below and various information, such as communication parameters for wireless communication. As the storage unit 201, not only memories such as a ROM and a RAM, but also storage media, such as a flexible disk, a hard disk, an optical disk, a magneto-optical disk, a compact disc (CD)-ROM, a CD-Recordable (R), a magnetic tape, a non-volatile memory card, and a digital versatile disk (DVD) may be used. The storage unit 201 may include a plurality of memories.

The control unit 202 is composed of one or more processors, such as central processing units (CPUs) or micro processing units (MPUs), and executes programs stored in the storage unit 201 to thereby control the entire communication device 102. The control unit 202 may control the entire communication device 102 in cooperation with computer programs and an operating system (OS) stored in the storage unit 201. The control unit 202 also generates data and signals (wireless frames) to be transmitted in communication with another communication device. The control unit 202 may include a plurality of processors, such as multi-cores, and the entire communication device 102 may be controlled by the plurality of processors.

The control unit 202 controls the function unit 203 to execute predetermined processing. The function unit 203 is hardware for the communication device 102 to execute predetermined processing. Data to be processed by the function unit 203 may be data stored in the storage unit 201, or may be data to be communicated with another communication device via the communication unit 206 to be described below.

The input unit 204 receives various operations from the user. The output unit 205 performs various output operations on the user through a monitor screen or a speaker. The output unit 205 may operate as a display unit that displays a screen, or as a notification unit that provides various notifications to the user. In this case, examples of the output from the output unit 205 may include a display on a monitor screen, an audio output through a speaker, and a vibration output. The input unit 204 and the output unit 205 may be implemented as one module, like a touch panel. The input unit 204 and the output unit 205 may be integrated with the communication device 102, or may be separated from the communication device 102. The input unit 204 and the output unit 205 may be devices connected via a wireless connection or a wired connection with the communication device 102. Alternatively, the output unit 205 may operate as a display control unit that causes a display unit of another communication device, which communicates with the communication device 102 via wireless communication or wired communication, to execute a screen display. More alternatively, the output unit 205 may operate as an output control unit that causes an output unit, such as a speaker, of the other communication device to execute an audio output, in addition to or in place of the screen display. The input unit 204 may receive information input by the user via another communication device that communicates with the communication device 102 via wireless communication or wired communication.

The communication unit 206 controls wireless communication complying with the IEEE 802.11ax standard. The communication unit 206 may also control wireless communication complying not only with the IEEE 802.11ax standard, but also with the other IEEE 802.11 series standards, and may control wired communication via a wired LAN or the like. The communication unit 206 controls the antenna 207 to transmit and receive signals for wireless communication generated by the control unit 202. If the communication device 102 is complying not only with the IEEE 802.11ax standard, but also with the NFC standard, the Bluetooth® standard, and the like, the wireless communication complying with these communication standards may be controlled. If the communication device 102 can execute wireless communication complying with a plurality of communication standards, communication units and antennas that are complying with the plurality of communication standards may be separately provided. The communication device 102 communicates data, such as image data, document data, and video data, with the communication device 103 via the communication unit 206. The antenna 207 may be provided separately from the communication unit 206, or may be integrated with the communication unit 206 as one module.

The antenna 207 is an antenna capable of establishing communication in the 2.4 GHz band, the 5 GHz band, and the 6 GHz band. In the present exemplary embodiment, the communication device 102 includes one antenna, but instead may include different antennas for each frequency band. If the communication device 102 includes a plurality of antennas, the communication device 102 may include communication units 206 corresponding to each antenna.

The communication device 103 has a hardware configuration similar to that of the communication device 102.

Figure 3:
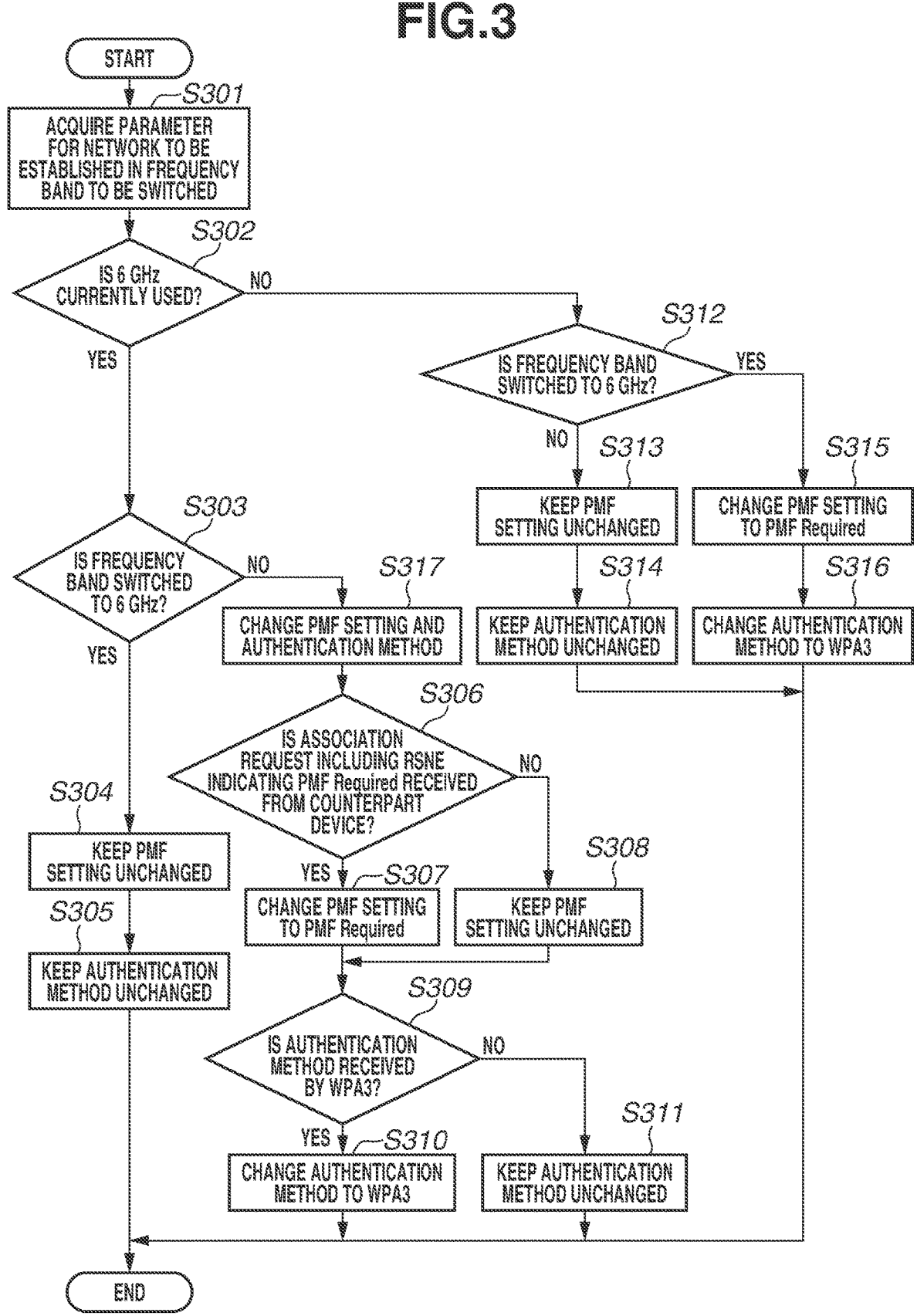
FIG. 3 is a flowchart illustrating processing to be executed when a frequency band to be used by the communication device 102 is switched.

FIG. 3 is a flowchart illustrating processing to be executed when the communication device 102 reads out computer programs stored in the storage unit 201 into the control unit 202 and executes the computer programs in the case of switching the frequency band to be used.

The communication device 102 starts the processing in this flowchart based on issuance of an instruction to switch the frequency band to be used from the user when the frequency band that is already used is set. The user may directly issue the instruction using the input unit 204 of the communication device 102. Alternatively, the user may issue the instruction with another device connected to the communication device 102 wirelessly or with a wire. Another device connected to the communication device 102 wirelessly or with a wire may issue an instruction to display a setting screen by inputting an Internet Protocol (IP) address of the communication device 102 to an address bar on a browser. Alternatively, the communication device 102 may start the processing in this flowchart based on a frequency band switching instruction from an application running on the communication device 102. Alternatively, the communication device 102 may start the processing in this flowchart based on change in an operation mode of the communication device 102. More alternatively, the communication device 102 may start the processing in this flowchart based on start-up of a predetermined application.

The communication device 102 acquires a parameter for a wireless network to be established in a frequency band to be switched (step S301). Specifically, the parameter acquired in this step is at least one of a Service Set Identifier (SSID), an authentication method, an encryption method, key information (e.g., Pairwise Master Key (PMK), PTK, and passphrase), information about the PMF setting, and information about the frequency band. SSID represents an identifier for identifying the AP (communication device 102). The encryption method is a method for encrypting communication between the AP (communication device 102) and the STA. PMK represents a master key on which various keys to be used in WPA are based. PTK is generated based on PMK. A passphrase is information used to encrypt communication between the AP (communication device 102) and the STA. Only the STA that has learned the passphrase set in the AP can communicate with the AP. Information about the PMF setting is information indicating which one of PMF Required, PMF Disabled, and PMF Enabled is set in the communication device 102. Information about the frequency band is information indicating which one of the 2.4 GHz band, the 5 GHz band, and the 6 GHz band is set as the frequency band in which the communication device 102 establishes a wireless network. In this step, the communication device 102 acquires information about at least the frequency band to be switched.

When the parameter for the wireless network to be switched is input from the user, the communication device 102 acquires the parameter. Alternatively, the communication device 102 may acquire the parameter from the storage unit 201 in the communication device 102. Alternatively, the communication device 102 may acquire the parameter from another device via wired communication or wireless communication.

Next, the communication device 102 determines whether the 6 GHz band is currently used as the frequency band (step S302). If the 6 GHz band is not currently used as the frequency band, or if the 2.4 GHz band or 5 GHz is currently used, the communication device 102 determines "No" in this step and then performs processing of step S312. In contrast, if the 6 GHz band is currently used as the frequency band, the communication device 102 determines "Yes" in this step and then performs processing of step S303.

The communication device 102 determines whether the frequency band is switched to the 6 GHz band (step S303). If the 6 GHz band is set as the frequency band in the parameters for the network to be switched that is acquired in step S301, the communication device 102 determines "Yes" in this step and then performs processing of step S304. In contrast, if the 2.4 GHz band or the 5 GHz band is set as the frequency band in the parameters for the network to be switched that is acquired in step S301, the communication device 102 determines "No" in this step and then performs processing of step S317.

If the 6 GHz band is set as the frequency band to be switched and as the currently used frequency band, the communication device 102 keeps the PMF setting unchanged (step S304). Since the 6 GHz band is set as the frequency band to be switched and as the currently used frequency band, the communication device 102 maintains the setting of PMF Required. In this case, the communication device 102 transmits Beacon, Probe Response, and Association Response together with information indicating PMF Required. The communication device 102 can provide a notification about PMF information using frame formats illustrated in FIGS. 5 and 6.

FIG. 5 illustrates a frame format for Robust Security Network Element (RSNE). RSNE is information included in a media access control (MAC) frame body of at least one of Beacon, Probe Response, and Association Response transmitted by the communication device 102.

RSNE includes fields of Element ID, Length, Version, Group Data Cipher Suite, and Pairwise Cipher Suite Count. RSNE further includes fields of Pairwise Cipher Suite List, AKM Suite Count, AKM Suite List, RSN Capabilities, and PMKID Count. RSNE further includes fields of PMKID List and Group Management Cipher Suite. The communication device 102 communicates the fields included in RSNE in order from Element ID to Group Management Cipher Suite at the end. At least one of the fields of RSNE may be omitted, or the order of some fields to be communicated may be changed.

Element ID represents an identifier for identifying an information element. In the present exemplary embodiment, Element ID includes identification information indicating RSNE.

Length is a field indicating an element data length. In the present exemplary embodiment, Length includes information indicating the data length of RSNE.

Version is a field indicating version information about a Robust Security Network (RSN) protocol. In the present exemplary embodiment, Version includes information indicating Version 1.

Group Data Cipher Suite is a field including a cipher selector used in a wireless network to protect a group address frame. The cipher selector is represented by a combination of Organizationally Unique Identifier (OUI) indicating a cipher and type information (Suite Type). For example, when TKIP is used as a cipher, the cipher selector is represented by a combination of OUI=00-0F-AC and type=2.

Pairwise Cipher Suite Count is a field indicating the number of Pairwise Cipher Suite selectors included in Pairwise Cipher Suite List to be described below.

Pairwise Cipher Suite List is a field including one or more Pairwise Cipher Suite selectors.

AKM Suite Count is a field indicating the number of AKM Suite selectors included in AKM Suite List to be described below.

AKM Suite List is a field including one or more AKM Suite selectors. Each AKM Suite selector indicates a combination of OUI indicating AKM Suite and type information. AKM Suite is represented by a combination of an authentication method, a key management type, and a key derivation type.

RSN Capabilities will be described with reference to FIG. 6 to be described below. RSN Capabilities include information indicating the PMF setting for the communication device 102.

PMKID Count is a field including information indicating the number of PMKIDs included in PMKID List to be described below.

PMKID List is a field including information indicating one or more PMKIDs that are held as valid information between the communication device that has transmitted RSNE and the destination communication device. PMKID represents an identifier for identifying PMK.

Group Management Cipher Suite is a field including a cipher selector used in a wireless network to protect Robust Management Frame including a group address.

FIG. 6 illustrates a frame format for RSN Capabilities.

RSN Capabilities include fields of Preauthentication, No Pairwise, PTKSA Replay Counter, and GTKSA Replay Counter. RSN Capabilities further include fields of Management Frame Protection Required (MFPR) and Management Frame Protection Capable (MFPC). RSN Capabilities further include fields of Joint Multi-Band RSNA, PeerKey Enabled, SPP A-MSDU Capable, and SPP A-MSDU Required. RSN Capabilities further include fields of PBAC and Extended Key ID for Individually Addressed Frames (EKIIAF). The communication device 102 communicates the fields included in the RSN Capabilities in order from Preauthentication to EKIIAF. At least one of the fields of RSN Capabilities may be omitted, and the order of some fields to be communicated may be changed.

Preauthentication is a field indicating whether the device that has transmitted RSNE supports the preauthentication function. The use of Preauthentication enables the STA to execute RSNA authentication with the AP before executing (Re)Association.

No Pairwise is a field indicating whether to support a Wired Equivalent Privacy (WEP) default key "0", as well as a pairwise key.

PTKSA Replay Counter is a field indicating a replay counter per PTKSA. PTKSA stands for Pairwise Transient Key Security Association, and indicates a context generated from the result of a 4-way handshake. A value "0" included in PTKSA Replay Counter indicates a replay counter "1" per PTKSA. Similarly, a value "1" included in PTKSA Replay Counter indicates a replay counter "2" per PTKSA.

GTKSA Replay Counter is a field indicating a replay counter per GTKSA. GTKSA stands for Group Temporal Key Security Association, and indicates a context generated due to success in replacement of GTK in one of a group key handshake or a 4-way handshake. GTK stands for Group Temporal Key. Like in PTKSA Replay Counter, the value "0" included in GTKSA Replay Counter indicates a replay counter "1" per GTKSA.

MFPR is a field indicating whether an RSN Capabilities transmission device (communication device 102) is required to protect Robust Management Frame. The value "1" included in MFPR indicates that the RSN Capabilities transmission device is required to protect Robust Management Frame. In the other cases, MFPR includes the value "0".

MFPC is a field indicating whether the RSN Capabilities transmission device (communication device 102) can execute protection of Robust Management Frame. If the RSN Capabilities transmission device can execute protection of Robust Management Frame, the value "1" is included in MFPC. In the other cases, the value "0" is included in MFPC.

The RSN Capabilities transmission device (communication device 102) can indicate the PMF setting for the communication device 102 using a combination of values included in MFPR and MFPC. Specifically, a combination of MFPR=1 and MFPC=1 indicates PMF Required. A combination of MFPR=0 and MFPC=0 indicates PMF Disabled. A combination of MFPR=0 and MFPC=1 indicates PMF Enabled. A combination of MFPR=1 and MFPC=0 is an incorrect combination.

Joint Multi-Band RSNA is a field indicating whether the RSN Capabilities transmission device (communication device 102) supports Joint Multi-Band RSNA.

PeerKey Enabled is a field indicating whether the RSN Capabilities transmission device (communication device 102) supports PeerKey handshake.

SPP A-MSDU Capable provides a notification indicating whether the RSN Capabilities transmission device (communication device 102) supports signaling and payload protected A-MSDUs. SPP stands for Signaling and Payload Protected. A-MSDU stands for Aggregate MAC Service Data Unit.

SPP A-MSDU Required is a field indicating whether the RSN Capabilities transmission device (communication device 102) requires signaling and payload protected A-MSDUs.

PBAC stands for Protected Block Ack Agreement Capable, and is a field indicating whether PBAC is set.

EKIIAF is a field indicating whether the RSN Capabilities transmission device (communication device 102) supports values in the range from "0" to "1" as key IDs for PTKSA and STKSA. STKSA stands for Station-To-Station Link (STSL) Transient Key Security Association.

As illustrated in FIGS. 5 and 6, the communication device 102 can use a specific field in RSN Capabilities included in RSNE to indicate the PMF setting for the communication device 102.

Referring again to FIG. 3, the communication device 102 keeps the PMF setting for the communication device 102 unchanged in step S304. In this case, PMF Required is maintained as the PMF setting for the communication device 102. The communication device 102 continuously transmits Beacon including RSNE including RSN Capabilities indicating MFPR=1 and MFPC=1. The communication device 102 may continuously transmit Probe Response or Association Response including similar RSNE, in addition to or in place of Beacon.

Next, the communication device 102 determines to keep the authentication method unchanged (step S305). Since the 6 GHz band is set as the frequency band to be switched and as the currently used frequency band, the communication device 102 maintains the setting of the authentication method. In this case, WPA3 is maintained as the authentication method used by the communication device 102. The communication device 102 continuously transmits Beacon including RSNE including a selector (OUI=00-0F-AC, Suite Type=8) indicating WPA3 in AKM Suite List. The communication device 102 may continuously transmit Probe Response or Association Response including similar RSNE, in addition to or in place of Beacon. The communication device 102 executes processing of step S305, and then terminates the processing in this flowchart.

Thus, when the 6 GHz band is set as the frequency band to be switched and as the currently used frequency band, the communication device 102 need not change the PMF setting and the setting of the authentication method. Thus, these settings are not changed.

When the determination result in step S303 indicates "No", the communication device 102 changes the PMF setting and the authentication method (step S317). Specifically, the communication device 102 changes the PMF setting from PMF Required to PMF Enabled. Further, the communication device 102 changes the setting of the authentication method from the setting for enabling only WPA3 to the setting for enabling at least one of WPA3 and WPA2 (WPA3/WPA2). In this case, the communication device 102 starts transmission of Beacon including RSNE including RSN Capabilities indicating MFPR=0 and MFPC=1. Further, the communication device 102 starts transmission of Beacon including RSNE including a selector (OUI=00-0F-AC, Suite Type=2) indicating WPA2, as well as the selector indicating WPA3, in AKM Suite List. The communication device 102 may start transmission of Probe Response or Association Response including similar RSNE, in addition to or in place of Beacon.

When the frequency band to be used is switched from the 6 GHz band to another frequency band (2.4 GHz band or 5 GHz band), the communication device 102 changes the PMF setting to PMF Enabled, thereby improving the interconnectivity. In other words, the communication device 102 changes the setting with which another communication device in which PMF Disabled is set cannot be connected, thereby making it possible to establish a connection with another communication device in which PMF Disabled is set. This leads to improvement of interconnectivity. When the frequency band to be used is switched from the 6 GHz band to another frequency band (2.4 GHz band or 5 GHz band), the communication device 102 changes the setting of the authentication method to the setting for enabling both of WPA3 and WPA2. This leads to improvement of interconnectivity. In other words, the communication device 102 changes the setting with which another communication device that supports only WPA2 cannot be connected, thereby making it possible to establish a connection with another communication device that supports only WPA2. This leads to improvement of interconnectivity.

Next, the communication device 102 determines whether information indicating PMF Required is received from a counterpart device (step S306). Specifically, the communication device 102 determines whether RSNE included in Association Request received from the STA (communication device 103) includes RSN Capabilities indicating PMF Required. If Association Request including RSNE indicating PMF Required is received, the communication device 102 determines "Yes" in this step and then performs processing of step S307. In contrast, if Association Request including RSNE indicating PMF Enabled of PMF Disabled is received, the communication device 102 determines "No" in this step and then performs the processing of step S308.

The communication device 102 changes the PMF setting for the communication device 102 to PMF Required (step S307). Thus, even in the case where the communication device 102 switches the frequency band to the 2.4 GHz band or the 5 GHz band, the security can be improved if the STA can execute PMF.

In contrast, if the determination result in step S306 indicates "No", the communication device 102 keeps the PMF setting for the communication device 102 unchanged (step S308). In this case, the communication device 102 maintains PMF Enabled as the PMF setting for the communication device 102.

Next, the communication device 102 determines whether the authentication method of WPA3 is received from the counterpart device (step S309). Specifically, the communication device 102 determines whether RSNE included in Association Request received from the STA (communication device 103) includes RSN Capabilities including information indicating WPA3. If Association Request including information indicating WPA3 is received, the communication device 102 determines "Yes" in this step and then performs processing of step S310. In contrast, if Association Request that does not include information indicating WPA3, or includes only information indicating, for example, WPA2, the communication device 102 determines "No" in this step and then performs processing of step S311.

The communication device 102 changes the setting of the authentication method for the communication device 102 to the setting for enabling only WPA3 (step S310). Thus, even in the case where the communication device 102 switches the frequency band to the 2.4 GHz band or the 5 GHz band, the security can be further improved if the STA can execute WPA3. After executing the processing of step S310, the communication device 102 terminates the processing in this flowchart.

In contrast, if the determination result in step S309 indicates "No", the communication device 102 keeps the setting of the authentication method for the communication device 102 unchanged (step S311). In this case, the communication device 102 maintains WPA3/WPA2 as the setting of the authentication method for the communication device 102. After executing the processing of step S311, the communication device 102 terminates the processing in this flowchart.

The communication device 102 may skip the processing of steps S306 to S311.

Even when the communication device 102 uses WPA2 or WPA3 as the authentication method, the communication device 102 can execute the PMF function. In the case of using WPA2 as the authentication method, PTK derived using a secure hash algorithm SHA1 is used as PTK for encrypting Robust Management Frame. In contrast, in the case of using WPA3 as the authentication method, PTK is derived using a secure hash algorithm SHA256.

The present exemplary embodiment illustrates an example where the communication device 102 changes the PMF setting and the setting of the authentication method based on switching of the frequency band from the 6 GHz band to another frequency band. However, the present exemplary embodiment is not limited to this example. For example, if a mode in which security is prioritized is enabled in the communication device 102, the communication device 102 may keep the PMF setting unchanged even when the frequency band is switched from the 6 GHz band to another frequency band. In this case, the communication device 102 may also keep the setting of the authentication method unchanged, in addition to or in place of the PMF setting. If the security prioritized mode is enabled and the PMF setting is kept unchanged, the communication device 102 may output a warning about interconnectivity to the user using the output unit 205. In this case, if the security prioritized mode is disabled, the communication device 102 executes processing of step S317 in FIG. 3.

Alternatively, when the frequency band is switched from the 6 GHz band to another frequency band, the communication device 102 may determine whether to change the PMF setting and the setting of the authentication method for the communication device 102 based on the PMF setting and the setting of the authentication method for the STA that is the counterpart device. In this case, if the communication device 102 determines "No" in step S303, the processing of step S317 is skipped. Instead of making the determination in step S306, it is determined whether PMF Disabled (MFPR=0, MFPC=0) is received from the counterpart device. If Association Request including information indicating PMF Disabled is received from the communication device 103, the communication device 102 changes the PMF setting for the communication device 102 to PMF Enabled. In contrast, if Association Request including information indicating PMF Required or PMF Enabled is received from the communication device 103, the communication device 102 maintains PMF Required as the PMF setting for the communication device 102. Next, instead of making the determination in step S309, the communication device 102 determines whether information indicating WPA3 as the authentication method is received from the counterpart device. If Association Request that includes information indicating WPA2 and does not include information indicating WPA3 is received from the communication device 103, the communication device 102 changes the setting of the authentication method for the communication device 102 to WPA3/WPA2. In contrast, if Association Request including information indicating WPA3 is received from the communication device 103, the communication device 102 maintains WPA3 as the setting of the authentication method for the communication device 102. Thus, even when the frequency band is switched, the communication device 102 changes the PMF setting and the like depending on the setting in the counterpart device, thereby maintaining the setting with high security if the setting is supported by the counterpart device.

Alternatively, if the communication device 102 simultaneously executes the AP operation and the STA operation in parallel, there is no need to change the PMF setting even when the frequency band of the network established in the AP is switched from the 6 GHz band to another frequency band. The setting of the authentication method need not be changed in addition to or in place of the PMF setting. In this case, the communication device 102 may output a warning about interconnectivity to the user using the output unit 205.

If the determination result in step S302 indicates "No", the communication device 102 determines whether the 6 GHz band is set as the frequency band to be switched (step S312). The processing of this step is similar to step S303. If the determination result in this step indicates "Yes", the communication device 102 performs processing of step S315. If the determination result in this step indicates "No", the communication device 102 performs processing of step S313.

If the 6 GHz band is not set as the frequency band to be switched and as the currently used frequency band, the communication device 102 keeps the PMF setting for the communication device 102 unchanged (step S313). Specifically, the communication device 102 maintains PMF Enabled as the PMF setting for the communication device 102, and does not change the PMF setting. Consequently, the communication device 102 can maintain the interconnectivity of the communication device 102.

Next, the communication device 102 keeps the setting of the authentication method for the communication device 102 unchanged (step S314). Specifically, the communication device 102 maintains WPA3/WPA2 as the setting of the authentication method for the communication device 102, and does not change the setting of the authentication method. Consequently, the communication device 102 can maintain the interconnectivity of the communication device 102. After executing the processing of step S314, the communication device 102 terminates the processing in this flowchart.

In contrast, if the 6 GHz band is not set as the currently used frequency band and the 6 GHz band is set as the frequency band to be switched, the communication device 102 changes the PMF setting for the communication device 102 (step S315). Specifically, the communication device 102 changes the PMF setting for the communication device 102 from PMF Enabled to PMF Required. This is because execution of the PMF function is required in the 6 GHz band.

Next, the communication device 102 changes the setting of the authentication method for the communication device 102 (step S316). Specifically, the communication device 102 changes the setting of the authentication method for the communication device 102 from WPA3/WPA2 to WPA3 alone. This is because the use of WPA3 as the authentication method is required in the 6 GHz band. After executing the processing of step S316, the communication device 102 terminates the processing in this flowchart.

As illustrated in FIG. 3, in the case of switching the frequency band to be used from the 6 GHz band to the 2.4 GHz band or the 5 GHz band, the communication device 102 changes the PMF setting from PMF Required to PMF Enabled, thereby improving the interconnectivity. Similarly, the communication device 102 changes the setting of the authentication method from the setting for enabling execution of only WPA3 to the setting for enabling execution of both of WPA3 and WPA2, thereby improving the interconnectivity.

Figure 4:
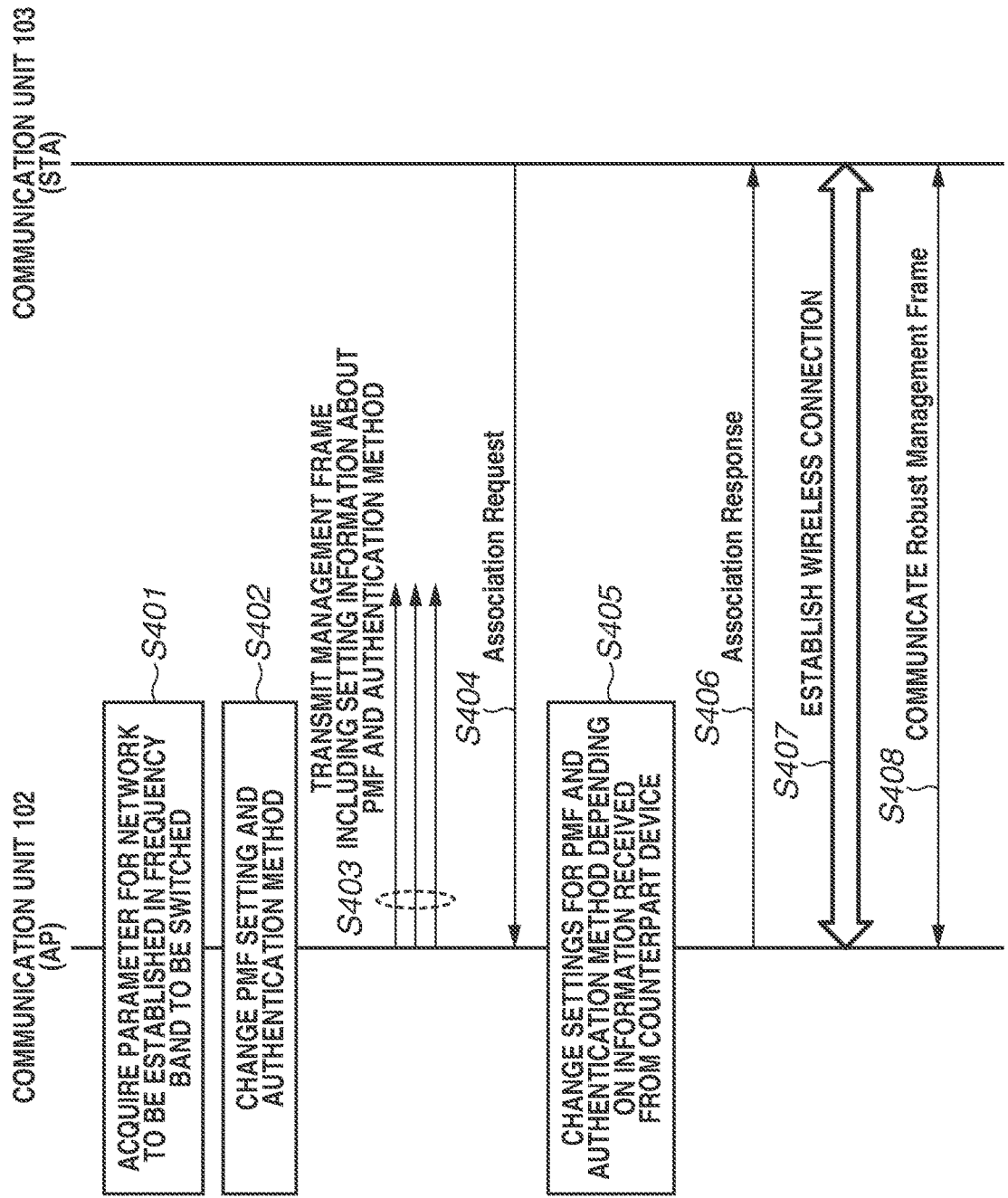
FIG. 4 is a sequence diagram illustrating an example of processing to be executed when the frequency band to be used by the communication device 102 is switched from a 6 GHz band to a 2.4 GHz band or a 5 GHz band.

FIG. 4 is a sequence diagram illustrating an example of processing to be executed when the communication device 102 switches the network from a network using the 6 GHz band to a network using the 2.4 GHz band or the 5 GHz band.

The communication device 102 starts the processing in this sequence diagram when the network is switched from the network that is already established and using the 6 GHz band to a network using the 2.4 GHz band or the 5 GHz band.

The communication device 102 acquires a parameter for a network to be switched (step S401). This processing is similar to step S301 in FIG. 3. In this case, the communication device 102 acquires information indicating that the 2.4 GHz band or the 5 GHz band is set as the frequency band of the network to be switched.

Since the 6 GHz band is set as the currently used frequency band and the 2.4 GHz band or the 5 GHz band is set as the frequency band to be switched, the communication device 102 changes the PMF setting and the setting of the authentication method for the communication device 102 (step S402). This processing is similar to step S317 in FIG. 3. The communication device 102 changes the PMF setting from PMF Required to PMF Enabled and changes the authentication method from WPA3 alone to WPA3/WPA2.

Next, the communication device 102 transmits a management frame including setting information about the PMF and the authentication method (step S403). Specifically, the communication device 102 transmits Beacon or Probe Response including RSNE including information (MFPR=1, MFPC=1) indicating PMF Required. The RSNE transmitted in this case includes AKM Suite List including both of the selector indicating WPA3 and the selector indicating WPA2. The communication device 102 transmits the management frame including setting information about the PMF and the authentication method using a frequency channel for the network to be switched in step S403. After executing the processing of step S401, the communication device 102 establishes the network to be switched prior to execution of processing of step S403.

The communication device 102 receives Association Request from the communication device 103 serving as the STA (step S404). In this case, Association Request includes RSNE including setting information about the PMF and the authentication method for the communication device 103.

The communication device 102 changes the PMF setting and the setting of the authentication method for the communication device 102 based on the received setting information about the PMF and the authentication method for the communication device 103 (step S405). This processing corresponds to the processing of steps S306 to S311 in FIG. 3. The communication device 102 may skip the processing of step S405.

The communication device 102 transmits Association Response to the communication device 103 (step S406). Association Response includes RSNE including information indicating the PMF setting and the setting of the authentication method for the communication device 102. If at least one of the PMF setting and the setting of the authentication method for the communication device 102 is changed in step S405, Association Response includes information indicating the changed setting.

The communication devices 102 and 103 establish a wireless connection (step S407).

The communication devices 102 and 103 communicate Robust Management Frame, based on the PMF setting (step S408). If the PMF setting for one of the communication devices 102 and 103 is PMF Enabled and the PMF setting for the other of the communication devices 102 and 103 is PMF Disabled, Robust Management Frame is communicated without being encrypted. If the PMF setting for one of the communication devices 102 and 103 is PMF Enabled and the PMF setting for the other of the communication devices 102 and 103 is PMF Required, Robust Management Frame is encrypted and communicated.

As described above, FIG. 4 illustrates an example of processing to be executed when the communication device 102 switches the frequency band to be used from the 6 GHz band to the 2.4 GHz band or the 5 GHz band. As illustrated in FIG. 4, the communication device 102 appropriately changes the PMF setting and the setting of the authentication method based on switching of the frequency band, thereby improving the interconnectivity.

The present exemplary embodiment illustrates an example where, in the case of switching the frequency band, the communication device 102 changes both of the PMF setting and the setting of the authentication method. However, the present exemplary embodiment is not limited to this example. Only the PMF setting may be changed.

In the present exemplary embodiment, the communication device 102 establishes a new network and then transmits a management frame including setting information about the PMF and the authentication method set based on the frequency band of the network to be switched. In this case, the communication device 102 may generate the management frame including setting information about the PMF and the authentication method set based on the frequency band of the network to be switched, after or before establishing a new network.

At least a part or the whole of the flowchart for the communication device 102 illustrated in FIG. 3 may be implemented by hardware. In the case of implementing the flowchart by hardware, a dedicated circuit may be generated, for example, on a field programmable gate array (FPGA) based on computer programs for implementing steps using a predetermined compiler, and the generated dedicated circuit may be used. Alternatively, a gate array circuit may be formed and implemented as hardware, like the FPGA. More alternatively, the flowchart may be implemented by an application specific integrated circuit (ASIC).

The present invention can also be implemented by processing in which a program for implementing one or more functions according to the above-described exemplary embodiments is supplied to a system or an apparatus via a network or a storage medium, and one or more processors in a computer of the system or the apparatus read out and execute the program. The present invention can also be implemented by a circuit (e.g., an ASIC) for implementing one or more functions.

The present invention is not limited to the above-described exemplary embodiments, and various modifications and changes can be made without departing from the spirit and scope of the present invention. Accordingly, the following claims are attached to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to improve interconnectivity by transmitting a management frame in which information about encryption of the management frame is appropriately set in a case of switching a frequency band from a 6 GHz band to another frequency band.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
an establishment unit configured to establish a wireless network in a predetermined frequency band;
a generation unit configured to generate a management frame complying with Institute of Electrical and Electronics Engineers (IEEE) 802.11 series standards including Robust Security Network Element (RSNE) including a value "1" in a Management Frame Protection Capable (MFPC) field and a value "0" in a Management Frame Protection Required (MFPR) field, in a case where the frequency band of the wireless network established by the establishment unit is switched from a 6 GHz band to another frequency band; and
a transmission unit configured to transmit the management frame generated by the generation unit.

2. The communication device according to claim 1, wherein in a case where the frequency band of the wireless network established by the establishment unit is switched from the other frequency band to the 6 GHz band, the generation unit generates the management frame including the RSNE including the value "1" in the MFPC field and the value "1" in the MFPR field.

3. The communication device according to claim 1, wherein in a case where the frequency band of the wireless network established by the establishment unit is switched from the 6 GHz band to the other frequency band, the generation unit generates the management frame including the RSNE including a Wi-Fi® Protected Access (WPA) 2 selector in AKM Suite List.

4. The communication device according to claim 3, wherein in a case where the frequency band of the wireless network established by the establishment unit is switched from the other frequency band to the 6 GHz band, the generation unit generates the management frame including the RSNE including a WPA3 selector in the AKM Suite List.

5. The communication device according to claim 1, further comprising a determination unit configured to determine whether another management frame including the RSNE including the value "0" in the MFPC field and the value "0" in the MFPR field is received from another communication device,
wherein in a case where the frequency band of the wireless network established by the establishment unit is switched from the 6 GHz band to the other frequency band, the generation unit generates the management frame including the RSNE including the value "1" in the MFPC field and the value "0" in the MFPR field based on a determination, by the determination unit, that the other management frame is received, and the generation unit generates the management frame including the RSNE including the value "1" in the MFPC field and the value "1" in the MFPR field based on a determination, by the determination unit, that the other management frame is not received.

6. The communication device according to claim 5,
wherein the determination unit further determines whether the other management frame including the RSNE including a WPA3 sector in AKM Suite List is received, and
wherein in a case where the frequency band of the wireless network established by the establishment unit is switched from the 6 GHz band to the other frequency band, the generation unit generates the management frame including the RSNE including no WPA2 selector and including a WPA3 selector in the AKM Suite List based on a determination, by the determination unit, that the other management frame is received, and the generation unit generates the management frame including the RSNE including a WPA2 selector in the AKM Suite List based on a determination, by the determination unit, that the other management frame is not received.

7. The communication device according to claim 5, wherein the other management frame is an association request.

8. The communication device according to claim 1, wherein in a case where a management frame including the RSNE including the value "1" in the MFPC field and the value "1" in the MFPR field is communicated with another communication device, Robust Management Frame to be communicated with the other communication device is encrypted.

9. The communication device according to claim 8, wherein the Robust Management Frame is at least one of a Deauthentication Frame, a Disassociation Frame, and an Action Frame.

10. The communication device according to claim 1, wherein the management frame generated by the generation unit is at least one of a Beacon frame, a Probe Response frame, and an Association Response frame.

11. The communication device according to claim 1, wherein the other frequency band is one of a 2.4 GHz band and a 5 GHz band.

12. The communication device according to claim 1, wherein the transmission unit transmits the management frame generated by the generation unit in a frequency channel in which a wireless network in the other frequency band is established.

13. A communication device comprising:
an acquisition unit configured to acquire information indicating a frequency band to be used in a case where the communication device provides a wireless network; and,
a transmission control unit configured to perform control to transmit a management frame including Robust Security Network Element (RSNE) including a value "1" in a Management Frame Protection Required (MFPR) field in frequency bands of a 6 GHz band, in a case where the communication device provides a wireless network in the frequency bands of the 6 GHz band based on the information,
wherein in a case where the communication device provides a wireless network in frequency bands of a 2.4 GHz band based on the information, the transmission control unit performs control to transmit a management frame including the RSNE including a value "0" in the MFPR field in the frequency bands of the 2.4 GHz band.

14. The communication device according to claim 13,
wherein the acquisition unit acquires information indicating the frequency band from a storage of the communication device, and wherein the communication device further includes a providing unit configured to provide a setting screen for accepting a user operation to change a frequency band to be used in a case where the communication device provides a wireless network to a Web browser of an external device.

15. The communication device according to claim 13, wherein the acquisition unit acquires information indicating the frequency band from a storage of the communication device, and
wherein the communication device further includes a display unit configured to display a setting screen for accepting a user operation to change a frequency band to be used in a case where the communication device provides a wireless network.

16. A control method for a communication device, comprising:
establishing a wireless network in a predetermined frequency band;
generating a management frame complying with Institute of Electrical and Electronics Engineers (IEEE) 802.11 series standards including Robust Security Network Element (RSNE) including a value "1" in a Management Frame Protection Capable (MFPC) field and a value "0" in a Management Frame Protection Required (MFPR) field, in a case where the frequency band of the wireless network established in the establishing is switched from a 6 GHz band to another frequency band; and
transmitting the generated management frame generated.

17. A control method for a communication device comprising:
acquiring information indicating a frequency band to be used in a case where the communication device provides a wireless network; and
performing control to
transmit a management frame including Robust Security Network Element (RSNE) including a value "1" in a Management Frame Protection Required (MFPR) field in the frequency bands of the 6 GHz band in a case where the communication device provides a wireless network in frequency bands of a 6 GHz band based on the information, and
transmit a management frame including the RSNE including a value "0" in the MFPR field in the frequency bands of the 2.4 GHz band in a case where the communication device provides a wireless network in frequency bands of a 2.4 GHz band based on the information.

18. A non-transitory computer-readable storage medium which stores a program for causing a computer to perform a control method for a communication apparatus, the control method comprising:
establishing a wireless network in a predetermined frequency band;
generating a management frame complying with Institute of Electrical and Electronics Engineers (IEEE) 802.11 series standards including Robust Security Network Element (RSNE) including a value "1" in a Management Frame Protection Capable (MFPC) field and a value "0" in a Management Frame Protection Required (MFPR) field, in a case where the frequency band of the wireless network established in the establishing is switched from a 6 GHz band to another frequency band; and
transmitting the generated management frame generated.

19. The communication device according to claim 1, wherein in a case where the frequency band of the wireless network established by the establishment unit is switched from the 6 GHz band to the other frequency band, and an authentication method is changed, the generation unit generates the management frame complying with the IEEE 802.11 series standards including the RSNE including the value "0" in the MFPR field.

* * * * *